United States Patent
Brown et al.

(10) Patent No.: US 10,956,401 B2
(45) Date of Patent: Mar. 23, 2021

(54) CHECKING A TECHNICAL DOCUMENT OF A SOFTWARE PROGRAM PRODUCT

(71) Applicant: International Business Machines Corporation, Armonk, NY (US)

(72) Inventors: Kevin Brown, Eastleigh (GB); Melita Saville, Hursley (GB); David Wright, Hursley (GB)

(73) Assignee: International Business Machines Corporation, Armonk, NY (US)

(*) Notice: Subject to any disclaimer, the term of this patent is extended or adjusted under 35 U.S.C. 154(b) by 159 days.

(21) Appl. No.: 15/824,475

(22) Filed: Nov. 28, 2017

(65) Prior Publication Data

US 2019/0163778 A1 May 30, 2019

(51) Int. Cl.
  *G06F 16/23* (2019.01)
  *G06F 16/33* (2019.01)
  *G06F 40/247* (2020.01)
  *G06F 40/279* (2020.01)

(52) U.S. Cl.
  CPC ...... *G06F 16/2365* (2019.01); *G06F 16/3344* (2019.01); *G06F 40/247* (2020.01); *G06F 40/279* (2020.01)

(58) Field of Classification Search
  None
  See application file for complete search history.

(56) References Cited

U.S. PATENT DOCUMENTS

| | | | |
|---|---|---|---|
| 8,762,827 B2 | 6/2014 | Spradley et al. | |
| 8,914,378 B2* | 12/2014 | Fukuda | G06N 5/025 707/741 |
| 9,378,065 B2 | 6/2016 | Shear et al. | |
| 2011/0270820 A1* | 11/2011 | Agarwal | G06F 40/253 707/709 |
| 2011/0289070 A1* | 11/2011 | Wade | G06F 16/3344 707/718 |
| 2012/0253790 A1* | 10/2012 | Heck | G06F 16/9535 704/9 |
| 2013/0262364 A1 | 10/2013 | Verbeek | |
| 2014/0278117 A1* | 9/2014 | Dobin | G01V 1/345 702/16 |
| 2015/0040226 A1* | 2/2015 | Barau | G06F 21/554 726/23 |
| 2017/0060840 A1* | 3/2017 | Dwarakanath | G06F 40/30 |
| 2019/0114356 A1* | 4/2019 | Senftleber | H04L 51/34 |

* cited by examiner

*Primary Examiner* — Kim T Nguyen
(74) *Attorney, Agent, or Firm* — Schmeiser, Olsen & Watts, LLP; Maeve Carpenter

(57) ABSTRACT

A method, computer system, and computer program product may include the steps of processing at least a part of the technical document to extract a term denoting a given element of the software program product, performing a respective check on whether the extracted term is correspondingly recorded in at least one of an accessible ontology and an accessible synonym database, whereby each ontology entry comprises a corresponding preferred term in respect of the given element of the software program product, and the accessible synonym database comprises respective entries of the corresponding preferred term, and a synonym corresponding to the corresponding preferred term, in respect of the given element of the software program product, and updating an accessible notification database according to a given check performed against at least one of the accessible ontology database and the accessible synonym database.

20 Claims, 3 Drawing Sheets

US 10,956,401 B2

CHECKING A TECHNICAL DOCUMENT OF A SOFTWARE PROGRAM PRODUCT

TECHNICAL FIELD

The present invention relates to a computer-implemented method, a computer-implemented system and computer program product that are applicable for checking a technical document of a software program product.

BACKGROUND

If different words are used for the same element and/or concept in a technical document providing instruction on how to use a given software product, a user may be confused consulting such a technical document.

SUMMARY

Aspects of a method, computer system, and computer program product for checking a technical document of a software program product is provided. A processor of a computing system processes at least a part of the technical document to extract a term denoting a given element of the software program product. A respective check on whether the extracted term is correspondingly recorded in at least one of an accessible ontology and an accessible synonym database is performed, whereby each ontology entry comprises a corresponding preferred term in respect of the given element of the software program product, and the accessible synonym database comprises respective entries of the corresponding preferred term, and a synonym corresponding to the corresponding preferred term, in respect of the given element of the software program product. An accessible notification database is updated according to a given check performed against at least one of the accessible ontology database and the accessible synonym database.

DETAILED DESCRIPTION

Figure 1:
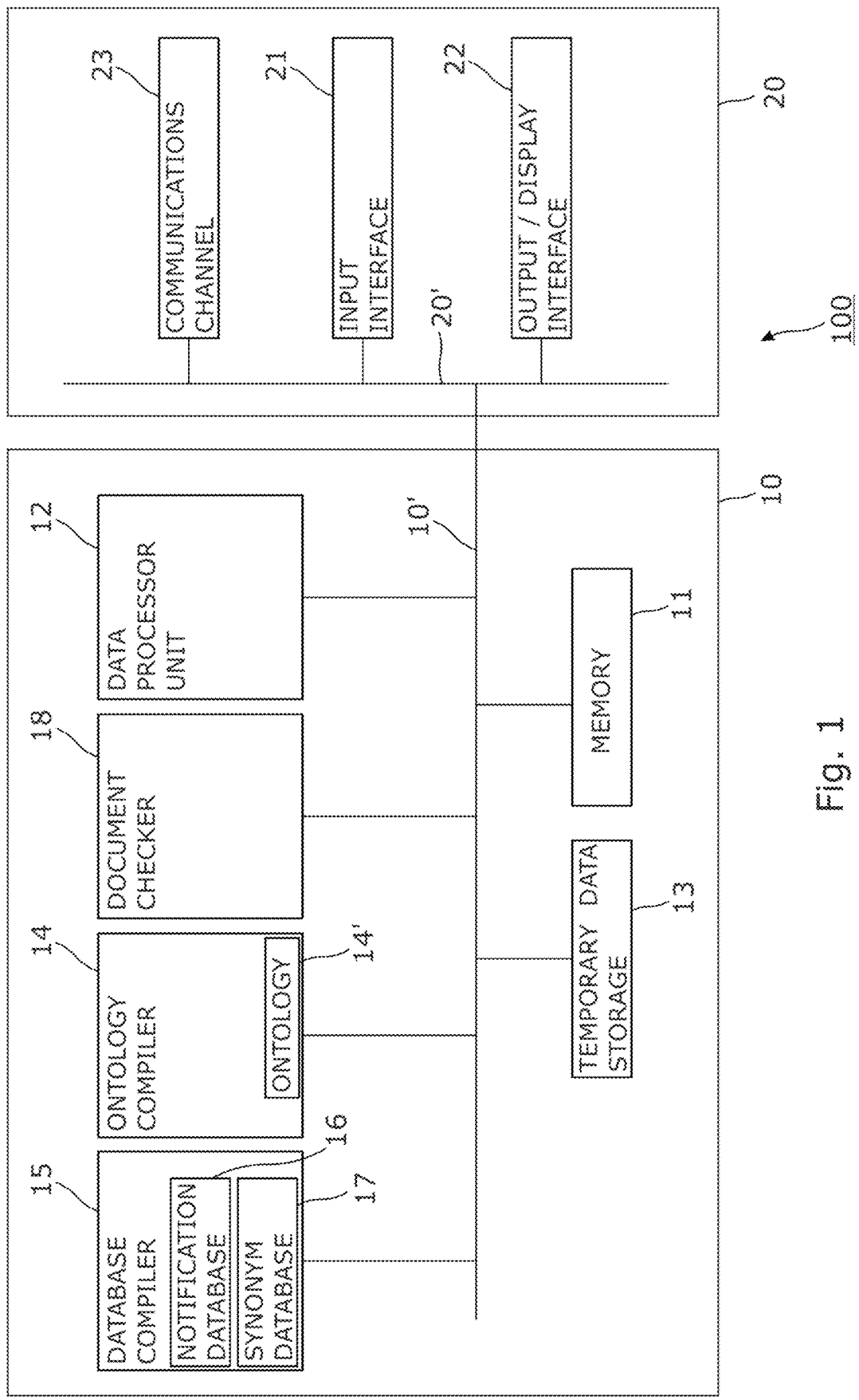
FIG. 1 schematically illustrates a general framework of operation for an embodiment of a system aspect of the present invention, in accordance with embodiments of the present invention.

It may be desirable to avoid the usage of synonyms in technical documents of software products because a user may not always be able to ascertain whether a synonym is indicative of a different element and/or concept of a given software product or whether the synonym has been used to stylistically enrich the description of that software product. By repetitively using the same terminology for documenting given elements and/or concepts in technical documents of software products: the software product may be used and/or understood with relative ease, and the technical document may also facilitate improved machine translation and/or interrogation of such technical documents.

Elements of a software product that are interfaced/externalized to a user, also known as externals, should be present/documented in a technical document that is provided on that software product. Examples of externals include, but are not limited to, buttons on a webpage, menu choices, error codes and so forth. A technical document that is substantially complete comprises given elements and/or concepts of a corresponding software product. Such a technical document may facilitate ease of use of that software product, build user-confidence in that technical document and the software product, and the technical document may also result in reduced post-sales work in answering questions that could arise in relation to any elements of the software product that are not documented in the technical document.

Accordingly, it may prove challenging to mitigate the problems associated with lack of consistency and/or completeness in respect of the documentation of given elements and/or concepts of a software product in any related instructive technical document. Conversely, it may also prove to be labor intensive and time-consuming to provide and/or alter a technical document that has such drawbacks, particularly in the view of the rapidly changing nature of software products.

According to an embodiment of an aspect of the present invention, there is provided a computer-implemented method for checking a technical document of a given software program product comprising: processing at least a part of the technical document to extract at least a term denoting at least a given element of the software program product; performing at least a respective check on whether the extracted term is correspondingly recorded in at least one of an accessible ontology and an accessible synonym database, whereby each ontology entry comprises at least a corresponding preferred term in respect of at least a given element of the software program product and the synonym database comprises respective entries of at least a preferred term, and at least a synonym corresponding to the preferred term, in respect of at least a given element of the software program product, and updating at least an accessible notification database according to a given check performed against at least one of the ontology and the synonym database. Some advantages associated with an embodiment of the present invention may be that certain anomalies in respect of terminology use for given elements of a software program product may be highlighted and such anomalies may be used to recommend amendments to, or used to directly amend, the technical document, thereby to yield increased consistency and/or completeness of terminology use of a technical document processed according to an embodiment of the present invention.

Embodiments of the present invention may include a step of performing a comparison of the updated notification database with the ontology and, in response to any given ontology entry being found to be absent in the updated notification database during this comparison, accordingly re-updating the notification database. Re-updating the notification database corresponds to a scenario where a given software program product comprises given elements that are not referenced in an associated technical document. An anomaly may be generated in this respect for informing the document creator that the technical document could be amended, where appropriate, to include terminology corresponding to the absent ontology entry. In this way, errors in the technical document may be reduced and a quality may be improved.

In response to the synonym database being found to comprise no corresponding entry for a given extracted term, the synonym database may be updated with such an entry. Such an entry may be used in relation to future processing of other extracted terms and so play a role in refining processing of a given technical document according to an embodiment of the present invention and to improved consistency of terminology use and/or reduced synonym usage in such a document.

In response to the synonym database being found to comprise a corresponding entry for a given extracted term, it may be determined whether such an entry is registered as a preferred term or as a synonym in the synonym database, which may extend the advantages of: being able to identify whether a preferred term has been used for a given element of a software program product in an associated technical document and, if this is not the case, it may be remedied by generating a recommendation to replace the extracted term with the preferred term for the document creator to apply. In this way, a given consistency of terminology use for respective elements of a given software program product in a technical document associated thereto may be increased/improved.

In respect of the compilation of the ontology, any given ontology entry is compiled on at least a basis of a given artifact extracted from the technical document. Because the ontology is compiled on a basis of the technical document to be processed, rather than another technical document and/or literature that may describe a similar software program product, the probability of erroneous processing of a given technical document may be reduced.

In response to any anomaly being registered during a given check performed in respect of a given extracted term against any one of the ontology and the synonym database, a notification of the anomaly may be stored in the notification database. Any anomalies stored in the notification database may be published in a dedicated document to recommend amendments to the technical document. Alternatively, such recommended amendments may be directly applied to the technical document and the user/document creator may be notified accordingly. In this way, a content of the technical document may be improved in respect of consistency and/or completeness of terminology use.

A given updated version of the notification database may be used for at least recommending an amendment of the technical document in respect of at least terminology use for a given element of the software program product. Examples of such recommendations may be to amend a given extracted term to the version of a given ontology entry or to be removed because the extracted term has been erroneously included. Alternatively, a recommendation may be in respect of an ontology entry corresponding to a given element that has been erroneously excluded from the technical document. In this way, a content of the technical document may be further improved in respect of consistency and/or completeness of terminology use.

According to an embodiment of another aspect of the present invention, there also may be provided a computer-implemented system for checking a technical document of a software program product, comprising at least a memory configurable to store at least an executable instruction, and at least a data processing unit that is operatively coupled to at least the memory and that is configurable to process at least a given part of the technical document to extract at least a term denoting at least a given element of the software program product, the system further comprising: at least an ontology compiler that is configurable to facilitate compilation of an ontology in respect of the software program product, each ontology entry comprising at least a corresponding preferred term in respect of at least a given element of the software program product; at least a database compiler that is configurable to generate at least one of: a notification database that is configurable to store at least a notification generated in response to a given check being performed on the technical document, and a synonym database comprising respective entries of at least a preferred term, and at least a synonym corresponding to the preferred term, in respect of at least a given element of the software program product, and a document checker that is operatively coupled to at least the ontology compiler, database compiler and the data processor unit, and that is configurable to: perform at least a respective check on whether the extracted term is correspondingly recorded in at least one of the ontology and the synonym database, and to update the notification database in respect of a given check being performed by the document checker against at least one of the ontology and the synonym database.

According to an embodiment of yet a further aspect of the present invention, there may be provided a computer program product for checking a technical document of a software program product in a system comprising at least a memory configurable to store at least an executable instruction, and at least a data processing unit that is operatively coupled to at least the memory and that is configurable to process at least a given part of the technical document to extract at least a term denoting at least a given element of the software program product, the system further comprising: at least an ontology compiler that is configurable to facilitate compilation of an ontology in respect of the software program product, each ontology entry comprising at least a corresponding preferred term in respect of at least a given element of the software program product; at least a database compiler that is configurable to generate at least one of a notification database that is configurable to store at least a notification generated in response to a given check being performed on the technical document, and a synonym database comprising respective entries of at least a preferred term, and at least a synonym corresponding to the preferred term, in respect of at least a given element of the software program product, the computer-program product comprising a computer-readable storage medium having program instructions embodied therewith that are executable to cause: configuring of a document checker that is operatively coupled to at least the ontology compiler, database compiler and the data processor unit to perform at least a respective check on whether the extracted term is correspondingly recorded in at least one of the ontology and the synonym database, and to update the notification database in respect of a given check being performed by the document checker against at least one of the ontology and the synonym database.

All the advantages of any one of the features of an embodiment of one aspect of the present invention may also be imparted to an embodiment of any other aspect.

Within the description, the same reference numerals or signs are used to denote the same parts or the like. The reference numerals are not indicative of any order of importance and/or sequence of operation in respect of given parts of any given embodiment of the present invention.

Unless otherwise specified, references made from here onwards are to a software program product and a technical document corresponding thereto, which are to be processed by and/or according to an embodiment of the present invention.

Reference is now made to FIG. 1, which schematically illustrates a general framework of operation for an embodiment of a system aspect 100 of the present invention, in accordance with embodiments of the present invention.

Turning to FIG. 1, an embodiment of the system aspect 100 of the present invention may be computer-implemented and a general framework that may be provided for an operation comprises given first and second configurational aspects 10, 20.

The first configurational aspect 10 may be implemented by the provision of: at least a memory 11 that is configurable to store at least an executable instruction, and at least a data processor unit 12 that is operatively coupled to the memory 11 and configurable to execute any instruction that is received at the data processor unit 12 and/or stored in the memory 11. Executable instructions to be stored in the memory 11 and/or to be processed by the data processor unit 12 may be user-given and/or provided by the running of a software program product according to an embodiment of the present invention. Temporary data storage 13 is also provided to facilitate storage of transient data that may be generated in an embodiment of the system aspect 100 of the present invention.

The second configurational aspect 20 may be implemented by the provision of at least a given display interface 22, which may comprise a display monitor provided as integrated in respect of a given laptop unit or as a standalone component provided externally in respect of a given computer and/or laptop unit. Within the context of an embodiment of the present invention, the display interface 22 is configurable to facilitate viewing of technical documentation on a given software program product by a user. At least a user-accessible, input interface 21 is also provided to facilitate user communication with at least any one of the memory 11 and the data processor unit 12. A communications channel 23 is also provided that may facilitate communication with other externally-provided devices, which may comprise a communication medium that may, for example, generally be wireless media or wired media.

Operative coupling within and between the first and second configurational aspects 10, 20 may be performed discernibly and may be facilitated by respectively provided buses 10', 20'. Such operative coupling is not limited to the use of buses 10', 20' and may be performed in any other appropriate way within the scope of an embodiment of the present invention.

A given technical document of a software program product, which is to be processed by an embodiment of the system aspect 100 of the present invention, is user-viewable at the display interface 22 of the second configurational aspect 20. The data processor unit 12, which is provided as a part of the first configurational aspect 10, is configurable to process a user-specifiable part of the technical document to extract at least a term denoting at least a given element of the software program product.

The first configurational aspect 10 also comprises an ontology compiler 14 that is operatively coupled to at least the memory 11 and the data processor unit 12. It may be configurable to compile an ontology 14' in which each entry comprises at least a corresponding preferred term in respect of at least a given element of the software program product. Any given ontology entry may be derivable on at least a basis of a given artifact of the software program product that is extracted from the technical document, for example, from where externals are specified and/or implemented.

The first configurational aspect 10 may also comprise a database compiler 15 that is operatively coupled to at least the memory 11 and the data processor unit 12. It may be configurable to generate at least one of: a notification database 16 that is configurable to store at least a notification generated in response to a given check being performed on the technical document, and a synonym database 17 comprising respective entries of at least a preferred term, and at least a synonym corresponding to the preferred term, in respect of at least a given element of the software program product.

Also provided within a scope of the first configurational aspect 10, may be a document checker 18 that is operatively coupled to at least the ontology compiler 14, database compiler 15 and the data processor unit 12. It may be configurable to perform a respective check of any term extracted by the data processor unit 12 against at least one of the ontology 14' and the synonym database 17.

The document checker 18 may be configurable to perform a check of any term extracted by the data processor unit 12, from a technical document of a software program product that is to be processed according to an embodiment of the present invention, against the ontology 14'.

In response to an entry of the extracted term existing in the ontology 14', the document checker 18 may be configurable to update the notification database 16 to include an entry of the element of the software program product corresponding to that extracted term and marking the entry has having been processed.

In response to an entry of the extracted term not existing at all in the ontology 14', the document checker 18 may be configurable to update the notification database 16 with an entry that the element of the software program product corresponding to that extracted term is absent in the ontology 14', and to store a notification corresponding to this anomaly.

The document checker 18 may be configurable to perform a further check of the notification database 16 that is updated as above-described against the ontology 14'. In response to any given ontology entry being found to be absent in the updated notification database 16, the document checker 18 is configurable to accordingly re-update the notification database 16 to store a notification of this anomaly.

In this way, the content of the technical document is checked by the document checker 18 to determine the technical document's completeness, that is, the extent to which given elements of the software program product are described in the technical document.

As described above, the notification database 16 may be updated to store a notification corresponding to any given anomaly that is registered during a given check performed by the document checker 18 against the ontology 14'. In this regard, any anomalies stored in the notification database 16 may be published in a dedicated document to recommend amendments to the technical document by the creator of the technical document, henceforth referred to as the document creator. Alternatively, such recommended amendments may be directly applied to the technical document and the user/document creator may be notified accordingly. In this way, the completeness of the technical document may be improved.

In respect of anomaly generation and recommending amendments for application to the technical document, the following scenarios may arise in an embodiment of the present invention:

The extracted term for a given element of the software program product in the technical document is a substantially similar match to a given ontology entry: this may be reported as an anomaly marked with a recommendation that the extracted term is amended to the version of the ontology entry;

There is no ontology entry corresponding to the extracted term: this may be reported as an error in an anomaly generated in response to such an event occurring, whereby the anomaly may be marked with a recommendation that the extracted term has been erroneously included in the technical document and that the term should be removed; and At least a given ontology entry is not found in the technical document, this scenario being brought to the fore in response to a given version of the updated notification database 16 being checked against the ontology 14': this may be reported as an error in an anomaly generated in response to such an event occurring, whereby the anomaly may be marked with a recommendation that the preferred term corresponding to the absent ontology entry has been erroneously excluded and that the term may be included where appropriate in the technical document.

The document checker 18 may be configurable to perform a check of any term extracted by the data processor unit 12, from a technical document of a software program product, against the synonym database 17. In this regard, the extracted term may generally pertain to a primary language element, such as, for example, a verb or a noun.

In response to a term being found, during a given check performed by the document checker 18, that the synonym database 17 does not comprise a corresponding entry for a given extracted term, the document checker 18 may be configurable to update the synonym database 17 with such an entry.

In response to a term being found, during a given check performed by the document checker 18, that the synonym database 17 comprises a corresponding entry for a given extracted term, the document checker 18 may be configurable to propagate a further check on whether such an entry is registered as a preferred term or as a synonym in the synonym database 17. In response to the term being found during such a further check that the extracted term is registered as a preferred term in the synonym database 17, no further action is performed. In response to the term being found during such a further check that the extracted term is registered as a synonym in the synonym database 17, the document checker 18 may be configurable: to determine the corresponding preferred term for that synonym from the synonym database 17, and to update the notification database 16 with such synonym usage and the term's corresponding preferred term. The notification database 16 may also be updated to store a notification on any anomaly that is registered in respect of any extracted term being stored as a synonym in the synonym database 17. Any such notifications on anomalies stored in the notification database 16 may be published in a dedicated document for recommending amendments, for example, to replace a synonym with a preferred term in respect of a given extracted term, to the technical document for the document creator to apply. Alternatively, such recommended amendments may be directly applied to the technical document and the user and/or document creator are notified accordingly.

By way of a given check being performed by the document checker 18 against the synonym database 17 as above-described, the content of the technical document may be processed to determine the respective consistency with which elements of a given software program product are denoted/represented. Such consistency may be improved/ increased by applying the recommendations based on notifications stored on any anomalies in the notification database 16 from any check performed against the synonym database 17.

Whilst shown to be autonomous, any one of the ontology compiler 14, database compiler 15 and the document checker 18 may be provided as encompassed within the data processor unit 12 in an embodiment of the present invention, and may also be configured to assign the tasks performed, in part or whole, to the data processor unit 12.

The notification database 16 is temporarily generated, initially empty and the notification database 16 may be stored in the temporary data storage 13 of the first configurational aspect 10. The synonym database 17 and the ontology 14' may be stored in the memory 11.

Figure 2:
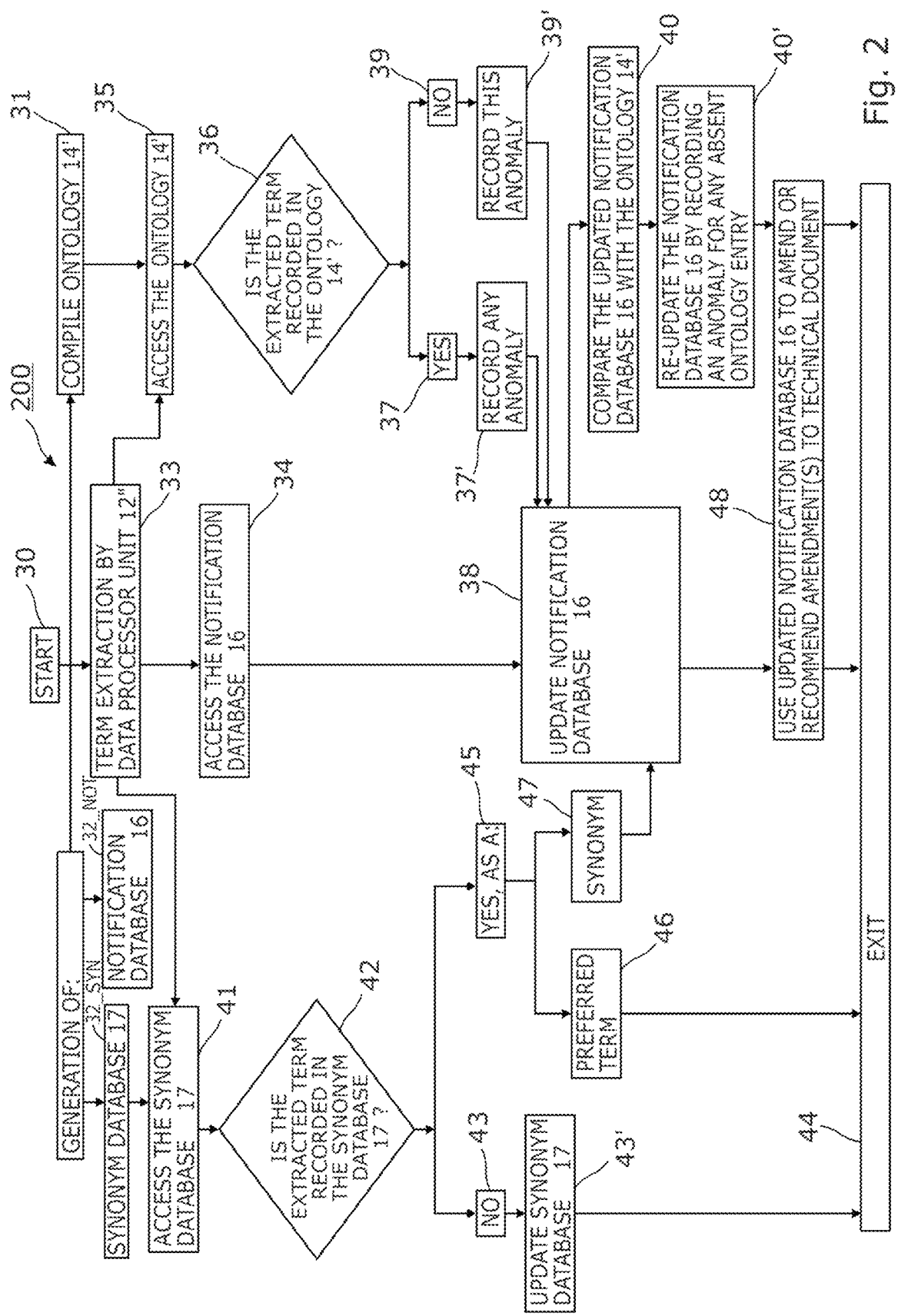
FIG. 2 shows a flowchart of a method, in accordance with embodiments of the present invention.

Reference is now made to FIG. 2, which shows a flow-chart of an e a method aspect 200, in accordance with embodiments of the present invention. It is initiated at block 30 in response to a technical document of a software program product being received for processing according to an embodiment of the present invention.

In response to receipt of a technical document of a given software program product at block 30, an ontology 14' is compiled at block 31 in which each entry comprises at least a corresponding preferred term in respect of at least a given element of the software program product. Each ontology entry is derivable on at least a basis of a given artefact that is extracted from the technical document where externals of the software program product are specified and/or implemented. Compilation of the ontology 14' is done by the ontology compiler 14 described with reference to FIG. 1.

Also, in response to receipt of a technical document of a given software program product at block 30, a given synonym database 17 and a given notification database 16 are generated at respective blocks 32_SYN and 32_NOT by the database compiler 15, as described above with reference to FIG. 1.

At block 33, the data processor unit 12 described in FIG. 1, is configurable to process a user-specifiable part of the technical document received at block 30 to extract at least a given term denoting at least a given element of the software program product described in that technical document.

Progressing to block 34, the notification database 16 generated at block 32_NOT by the database compiler 15 is accessed for general availability in relation to subsequently-performed steps in an embodiment of the present invention.

In an embodiment of the present invention, a respective check is performed on whether any given term extracted at block 33 is correspondingly recorded in the ontology 14' generated at block 31 and the synonym database 17 generated at block 32_SYN. Such respective checks are performed by the document checker 18 as described with reference to FIG. 1.

In this regard, progress is made to block 35 where the ontology 14' is accessed. At block 36, a comparison is made between the extracted term of block 33 and the ontology 14' accessed at block 35.

In response to an entry of the extracted term existing in the ontology 14', which event is generally depicted at block 37, the document checker 18 may be configurable to update the notification database 16 at block 38 to include an entry of the element of the software program product corresponding to that extracted term and marking entry has having been processed. In this regard, an anomaly may be generated at block 37' in response to the extracted term being a substantially similar match to a given ontology entry. Such an anomaly may be marked with a recommendation that the extracted term is amended to the version of the ontology entry.

In response to no ontology entry corresponding to the extracted term, which event is generally depicted at block 39, the document checker 18 may be configurable to generate a notification corresponding to this anomaly at block 39' to be stored in the notification database 16 during an updating step performed at block 38. In this regard, the anomaly may be marked with a recommendation that the extracted term has been erroneously included in the technical document and that the term should be removed. The document checker 18 may also be configurable to generally update the notification database 16 at block 38 with an entry that the element of the software program product corresponding to that extracted term is absent in the ontology 14'.

At block 40, the document checker 18 may be configurable to perform a further check of the updated notification database 16, as above-described, against the ontology 14'. In response to any given ontology entry being found to be absent in the updated notification database 16, the document checker 18 may be configurable to accordingly re-update the notification database 16 and to store a notification of this anomaly at block 40'. The anomaly may be marked with a recommendation that the preferred term corresponding to the absent ontology entry has been erroneously excluded and that the preferred term may be included where appropriate in the technical document. In this way, the content of the technical document may be checked according to an embodiment of a method aspect 200 of the present invention, to determine a technical document's completeness, that is, the extent to which given elements of the software program product are described in the technical document.

In this regard, progress is made to block 41 where the synonym database 17 is accessed. At block 42, a comparison is made between the extracted term of block 33 and the accessed synonym database 17.

In response to the synonym database 17 comprising no corresponding entry for the extracted term, which event is generally depicted at block 43, the document checker 18 may be configurable to update the synonym database 17 with such an entry at block 43'. Progress may be made therefrom to block 44, which marks the end of any steps performed according to an embodiment of the present invention.

In response to the synonym database 17 comprising a corresponding entry for the extracted term, which event is generally depicted at block 45, the document checker 18 may be configurable to perform a further check to determine whether such an entry is registered as a preferred term or as a synonym in the synonym database 17. In response to the extracted term being recorded as a preferred term in the synonym database 17, which event is depicted generally at block 46, no further action need be taken and progress may be made therefrom to block 44 to exit processing undertaken according to an embodiment of the present invention. In response to the extracted term being recorded as a synonym in the synonym database 17, which event is depicted generally at block 47, the document checker 18 may be configurable: to determine the corresponding preferred term for that synonym from the synonym database 17, to update the notification database 16 at block 38 with such synonym usage and to store a notification of such an anomaly marked with a recommendation to, for example, to amend the extracted term by replacing the synonym with the synonym's corresponding preferred term. In this way, a given consistency with which respective elements of a software program product are denoted in a given technical document may be checked according to an embodiment of a method aspect 200 of the present invention.

At block 48, recommendations based on notifications stored on any anomalies in the notification database 16 generated either with respect to the synonym database 17 at block 47 and/or generated with respect to the ontology 14' may be applied to the technical document and/or broadcasted to a user and/or the document creator. In this way, the consistency and/or completeness of the technical document may be further improved. Progress may be made from block 48 to block 44, thereby to end of any processing according to an embodiment of the present invention.

Figure 3:
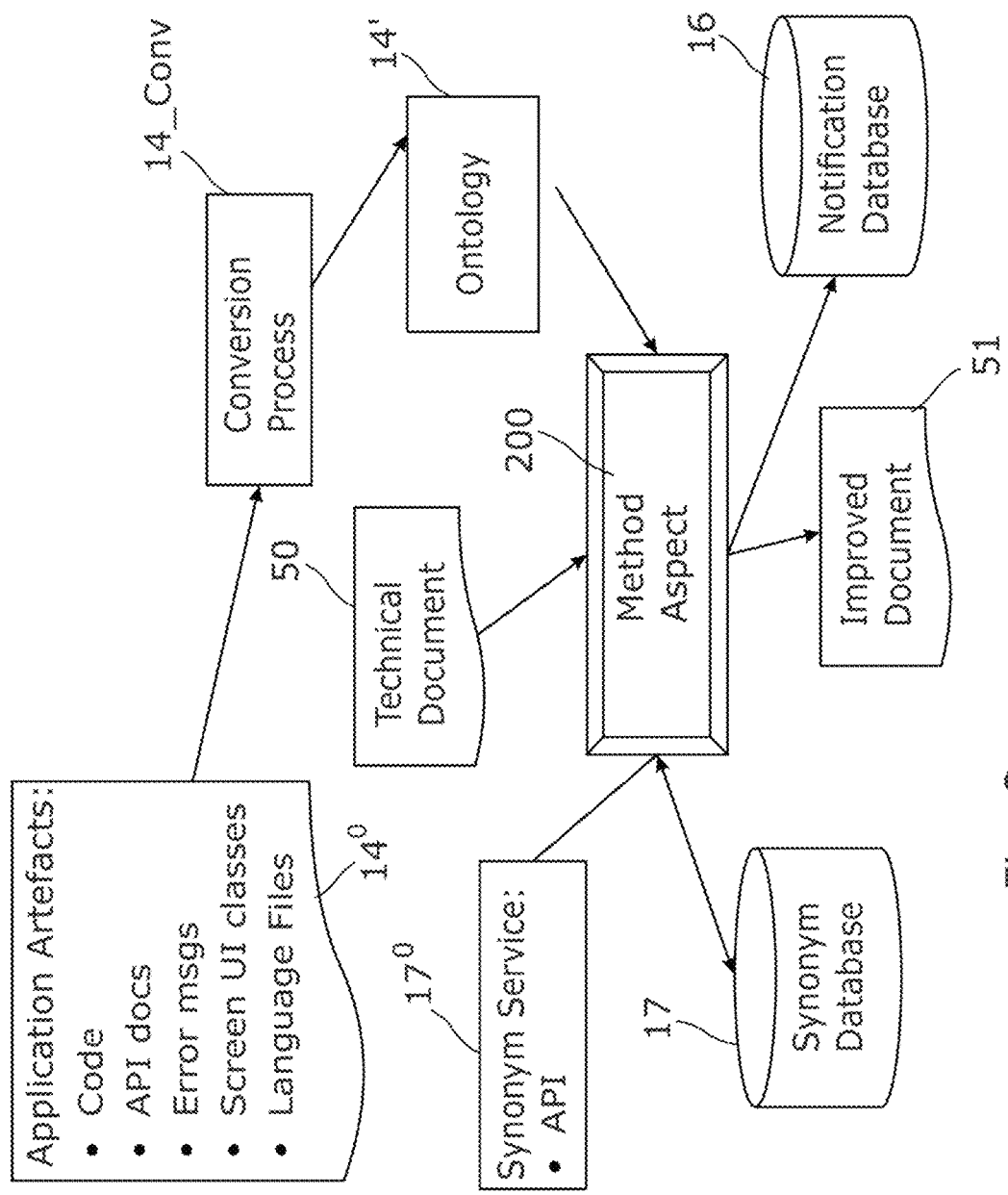
FIG. 3 schematically combines given parts of respective embodiments of a system aspect of FIG. 1 and a method aspect of FIG. 2, in accordance with embodiment of the present invention.

Reference is now made to FIG. 3, which schematically combines given parts of respective embodiments of a system aspect 100 described herein above with reference to FIG. 1, and a method aspect 200 described hereinabove with reference to FIG. 2, in accordance with embodiment of the present invention.

A technical document 50 of a given software program product is received and processed according to respective steps of an embodiment of a method aspect 200 as described hereinabove with reference to FIG. 2. To begin with, the data processor unit 12 is configurable to extract at least a given term of the software program product from at least a given part of the technical document 50 as denoted at block 33 of FIG. 2. Configuration of the data processor unit 12 in this regard is user-specifiable such that the technical document 50 may be scanned line by line, in entirety or in part(s), to perform the term extraction.

In respect of the technical document 50, an ontology 14' may be compiled by the ontology compiler 14 as described with reference to FIG. 1. Given artifacts of the software program product, examples of which are shown in block $14^O$, may be extracted from the technical document 50 where externals are specified and/or implemented and subjected to a conversion process shown at block 14_CONV to create the ontology 14'.

Viewing FIG. 3 in combination with FIG. 1, the database compiler 15 may be configurable to generate the synonym database 17, which is initially empty and comprises two columns: one column for respective entries of at least a preferred term/keyword pertaining to a given element of the software program product, and a corresponding synonym array populated with given synonyms for that preferred term/keyword. The synonym array may be populated using a synonym service $17^O$ describing synonym usage for different elements of known and/or related software program products.

Viewing FIG. 3 in combination with FIG. 1, the database compiler 15 may be configurable to generate the notification database 16, which is: a temporary database that preferably exists for the duration of processing of the technical document 50 according to an embodiment of the present invention, and which may be initially empty.

Viewing FIG. 3 in combination with FIG. 2, the notification database 16 is configurable to store: any processed ontology entries 14' and also respective notifications on any anomalies generated in response to a given check being performed in respect of a given term extracted from the technical document against at least one of the ontology 14' and the synonym database 17. Any such notifications on anomalies may be published in a dedicated document for use in recommending amendments to the technical document 50 for the document creator to apply. Alternatively, such recommended amendments may be directly applied to the technical document 50 and the document creator and user are notified accordingly. In this way, an improved technical document 51 may be generated that is relatively more consistent and/or complete in terminology use in comparison to technical document 50 in its original version before being processed according to an embodiment of the present invention.

Examples are now provided on the different scenarios in which an embodiment of the present invention may be applicable:

Scenario 1

A given technical document 50 inconsistently refers to:
given elements of a product/application as shown:
  a. Run the command zosctrun
  b. Run the command zOSCTrun
a given element in respect of an interface of a product/application where the user may type some information:
  a. Insert into the dialog box called "Your answer"
  b. Insert into the response box called "Your answer"

It may be that the technical document 50 may give rise to confusion when consulted by a user and/or machine-translated since it cannot be ascertained whether the highlighted terms in each category of the examples provided refer to the same elements or whether they refer to, different, but somehow similar, elements of the product/application.

Processing such a technical document 50, through method steps 35, 36, 37, 37', 38, 48 of an embodiment of a system aspect 200 of the present invention may result in the words, "zOSCTrun" and "response box" being highlighted as respectively being in a substantially similar form to given ontology entries, "zosctrun" and "dialog box" in the ontology 14'. Respective anomalies are reported in respect of the highlighted terms and the anomalies may be stored in the notification database 16 for recommending and/or making amendments to the technical document 50 to the document creator, thereby to yield an improved version 51 of the technical document. In this regard, it may be recommended to change the highlighted entries "zOSCTrun" and "response box" to closely matched "zosctrun" and "dialog box" registered in the ontology 14' as preferred terms derived from artifacts of the product/application described in the technical document 50. Thus, a given consistency of terminology use of given elements of the product/application described in the technical document 50 may be increased.

Scenario 2

A given technical document 50 makes reference to elements that do not exist in a product/application. For example, in respect of:
  a. Insert into the dialog box called "Your answer"
  b. Insert into the response box called "Your answer"

Progressing the technical document 50 through method steps 35, 36, 39, 39', 38, 48 of an embodiment of the system aspect 200 of the present invention, the underlined term, "Your answer" is not found in the ontology 14'. An anomaly is generated in this respect and stored in the notification database 16 for informing the document creator that the product/application likely does not contain a given element corresponding to such terminology, that the terminology has been erroneously included in the technical document and that the term should be removed from the technical document 50. Thus, errors in the technical document 50 may be reduced and its quality may be improved.

Scenario 3

The product/application comprises given elements that are not referenced in the technical document 50, which may be found in response to processing the technical document 50 through method steps 38, 40, 40', 48 of an embodiment of a system aspect 200 of the present invention. In response to finding that the ontology 14' comprises a given entry, for example, "Build address" that is not in the notification database 16, and therefore likely not referenced in the technical document 50, an anomaly is generated in this respect for informing the document creator that the technical document 50 could be amended, where appropriate, to include terminology corresponding to the absent ontology entry. In this way, errors in the technical document 50 may be reduced and the technical document's quality may be improved.

With reference to the above scenarios, in an embodiment of the present invention, a given extracted term does not pertain only to a singular element of the software program product, such as, for example, a command like "zosctrun", but also encompasses externals provided to interface with a user of that product that may comprise verbs and/or nouns, for example, "dialog box" and/or "Build address".

The present invention may be a system, a method and/or a computer program product at any possible technical level of integration. The computer program product may include a computer readable storage medium (or media) having computer readable program instructions thereon for causing a processor to carry out the aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented program language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In any of the above aspects, the various features may be implemented in hardware or as software modules running on one or more data processors.

The present invention has been described above purely by way of example and modifications of detail can be made within the scope of the present invention.

Each feature disclosed in the description, and where appropriate, the claims and/or the drawings may be provided independently or in any appropriate combination.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

In another embodiment, the proposed invention solves a technical problem necessarily rooted in computer technology because the resulting graph may improve search engine technology, which saves computer resources by providing relevant information in a location that allows the user to avoid navigating to additional website or perform additional searching for information.

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for checking a technical document of a given software program product, the method comprising:

processing, by a processor of a computing system, at least a part of the technical document to extract a term denoting a given element of the software program product within the technical document;

performing, by the processor, a respective check on whether the extracted term from the technical document is correspondingly recorded in an accessible ontology and an accessible synonym database, whereby each ontology entry comprises a corresponding preferred term in respect of the given element of the software program product; and the accessible synonym database comprises respective entries of the corresponding preferred term and a synonym corresponding to the corresponding preferred term, in respect of the given element of the software program product; and updating, by the processor, an accessible notification database according to a given check performed against at least one of the accessible ontology database and the accessible synonym database, wherein the accessible notification database is used to at least one of: amend or recommend an amendment to the term extracted from the technical document to modify the technical document to achieve a consistency of terminology used throughout the technical document.

2. The method as claimed in claim 1, further comprising: performing, by the processor, a comparison of the updated accessible notification database with the ontology entry and, in response to any given ontology entry being found to be absent in the updated accessible notification database during the comparison, accordingly re-updating the accessible notification database.

3. The method as claimed in claim 1 wherein, in response to the accessible synonym database being found to comprise no corresponding entry for a given extracted term, the accessible synonym database is updated with the entry for the given extracted term.

4. The method as claimed in claim 1, further comprising, in response to the accessible synonym database being found to comprise a corresponding entry for a given extracted term, determining, by the processor, whether such an entry is registered as a preferred term or as a synonym in the accessible synonym database.

5. The method as claimed in claim 1 wherein, in respect of the compilation of the ontology, any given ontology entry is compiled on a basis of a given artifact extracted from the technical document.

6. The method as claimed in claim 1 wherein, in response to any anomaly being registered during a given check performed in respect of a given extracted term against any one of the accessible ontology database and the accessible synonym database, a notification of the anomaly is stored in the accessible notification database.

7. The method as claimed in claim 1 wherein, a given updated version of the accessible notification database is used for recommending an amendment of the technical document in respect of at least terminology use for a given element of the software program product.

8. A computer system comprising:
a processor;
a memory device coupled to the processor; and
a computer readable storage device coupled to the processor, wherein the storage device contains program code executable by the processor via the memory device to implement a method for checking a technical document of a software program product, the method comprising:

processing, by the processor, at least a part of the technical document to extract a term denoting a given element of the software program product;

performing, by the processor, a respective check on whether the extracted term is correspondingly recorded in at least one of an accessible ontology and an accessible synonym database, whereby each ontology entry comprises a corresponding preferred term in respect of the given element of the software program product, and the accessible synonym database comprises respective entries of the corresponding preferred term, and a synonym corresponding to the corresponding preferred term, in respect of the given element of the software program product; and updating, by the processor, an accessible notification database according to a given check performed against at least one of the accessible ontology database and the accessible synonym database wherein the accessible notification database is used to at least one of: amend or recommend an amendment to the term extracted from the technical document modify the technical document to achieve a consistency of terminology used throughout the technical document.

9. The system as claimed in claim 8 wherein; a document checker is configurable to: perform a comparison of the updated notification database with the ontology, and, in response to any given ontology entry being found to be absent in the updated accessible notification database during the comparison, correspondingly re-updating the accessible notification database with the given ontology entry.

10. The system as claimed in claim 9, wherein, in response to the entry being found, during a given check performed by the document checker, that the accessible synonym database does not comprise a corresponding entry for a given extracted term, the document checker is configurable to update the accessible synonym database with the entry.

11. The system as claimed in claim 9, wherein, in response to the entry being found, during a given check performed by the document checker, that the accessible synonym database comprises a corresponding entry for a given extracted term, the document checker is configurable to propagate a further check on whether the corresponding entry is registered as at least one of: a preferred term and a synonym in the accessible synonym database.

12. The system as claimed in claim 8 wherein, an ontology compiler is configurable to compile any given ontology entry on a basis of a given artifact of the software program product that is extracted from the technical document.

13. The system as claimed in claim 8 wherein, the accessible notification database is configurable to be updated with a notification for any anomaly that is registered during a given check performed in respect of a given extracted term against any one of the ontology and the accessible synonym database.

14. The system as claimed in claim 8 wherein, a given updated version of the accessible notification database is configurable to broadcast a recommendation for amending the technical document in respect of at least terminology use for a given element of the software program product.

15. A computer program product, comprising a computer readable hardware storage device storing a computer readable program code, the computer readable program code comprising an algorithm that when executed by a computer processor of a computing system implements a method for checking a technical document of a software program product, the method comprising:

processing, by a processor of a computing system, at least a part of the technical document to extract a term denoting a given element of the software program product;

performing, by the processor, a respective check on whether the extracted term is correspondingly recorded in at least one of an accessible ontology and an accessible synonym database, whereby each ontology entry comprises a corresponding preferred term in respect of the given element of the software program product, and the accessible synonym database comprises respective entries of the corresponding preferred term, and a synonym corresponding to the corresponding preferred term, in respect of the given element of the software program product; and updating, by the processor, an accessible notification database according to a given check performed against at least one of the accessible ontology database and the accessible synonym database wherein the accessible notification database is used to at least one of: amend or recommend an amendment to the term extracted from the technical document to modify the technical document to achieve a consistency of terminology used throughout the technical document.

16. The computer program product as claimed in claim 15, further comprising: configuring, by the processor, of a document checker to perform a comparison of the updated accessible notification database with the ontology, and, in response to any given ontology entry being found to be absent in the updated accessible notification database during the comparison, correspondingly re-updating the accessible notification database with the given ontology entry.

17. The computer program product as claimed in claim 16, wherein in response to the term being found, during a given check performed by the document checker, that the synonym database does not comprise a corresponding entry for a given extracted term, the document checker is configurable to update the accessible synonym database with the entry.

18. The computer program product as claimed in claim 16, wherein in response to the term being found, during a given check performed by the document checker, that the accessible synonym database comprises a corresponding entry for a given extracted term, the document checker is configurable to propagate a further check on whether the corresponding entry is registered as at least one of: a preferred term or as a synonym in the accessible synonym database.

19. The computer program product as claimed in claim 15, wherein configuration of an ontology compiler to compile any given ontology entry on a basis of a given artifact of the software program product that is extracted from the technical document.

20. A computer program product as claimed in claim 15, wherein configuration of the accessible notification database thereby to be updated with a notification for any anomaly that is registered during a given check performed in respect of a given extracted term against any one of the ontology and the accessible synonym database.

* * * * *